March 27, 1928.  
E. E. CRONENWETH  
TELLER'S CAGE  
Filed March 17, 1926

Inventor  
EARL E. CRONENWETH  
By Mann & Co  
Attorney

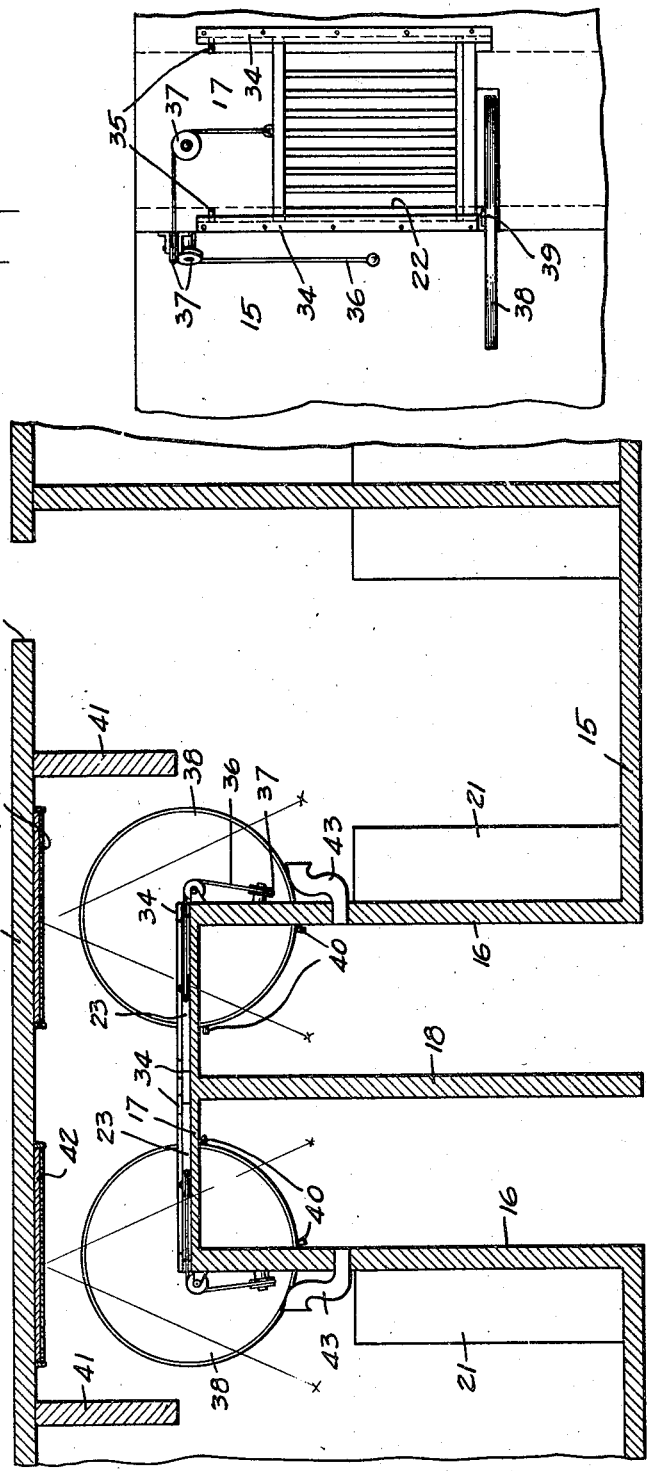

Patented Mar. 27, 1928.

1,663,681

UNITED STATES PATENT OFFICE.

EARL E. CRONENWETH, OF GLENDALE, CALIFORNIA.

TELLER'S CAGE.

Application filed March 17, 1926. Serial No. 95,276.

My invention relates to and has for its purpose the provision of a teller's cage for banks by which a teller is enabled to receive and deliver moneys from his window with the same facility and dispatch as with present windows, yet without exposing himself to the depositors and thereby minimizing personal injury to the teller and the possibility of theft of moneys handled by the teller.

I will describe only one form of teller's cage embodying my invention, and will then point out the novel features thereof in claims.

In the drawings

Figure 2 is a horizontal sectional view of the teller's cage shown in Figure 1;

Figure 3 is a fragmentary view showing in rear elevation the window and supporting means therefor embodied in the teller's cage shown in the preceding views.

Figure 1:
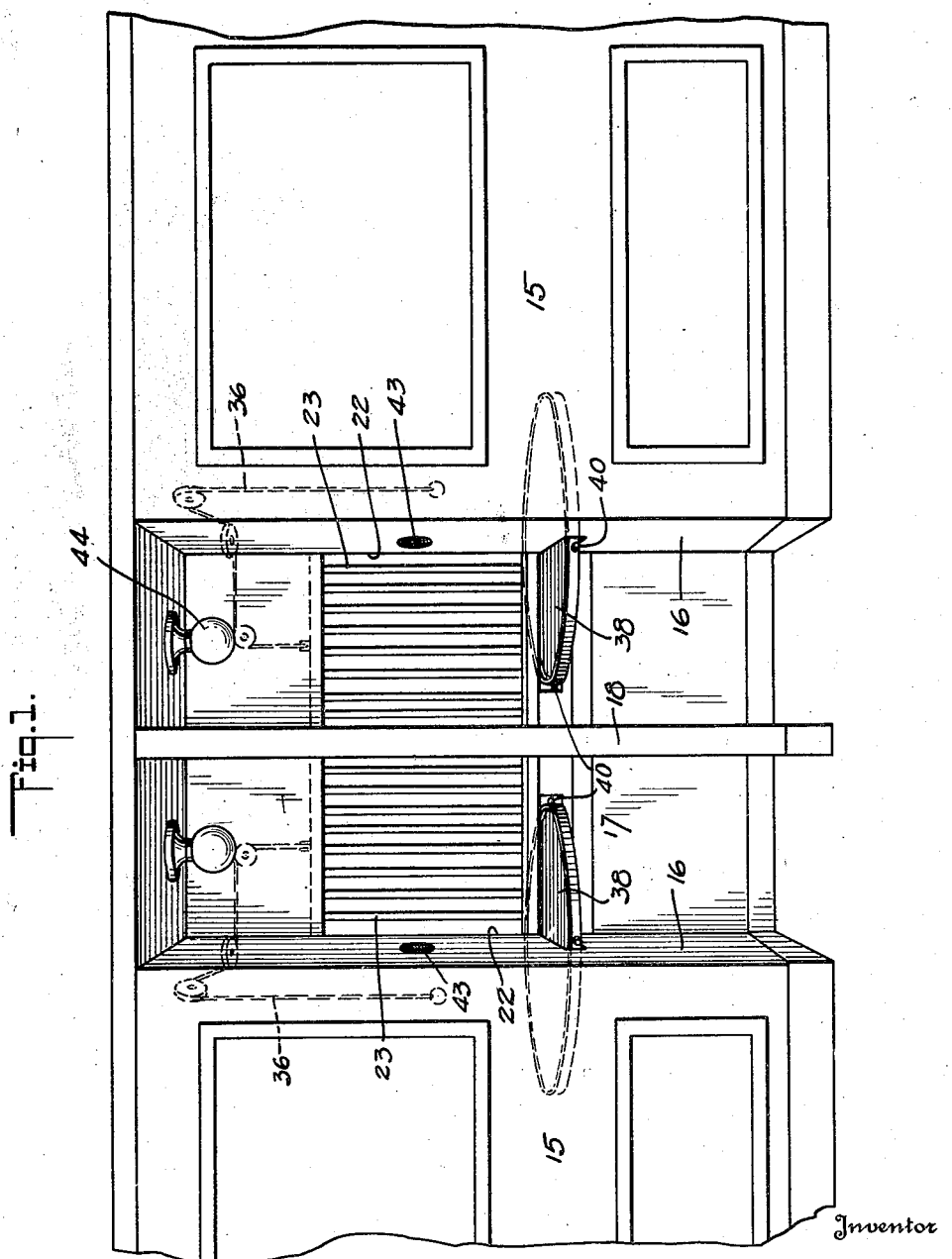
Figure 1 is a view showing in perspective one form of teller's cage embodying my invention.

Referring specifically to the drawings, in which similar reference characters refer to similar parts in each of the views, I have in the present instance shown two tellers' cages and the necessary equipment for each cage. The front walls 15 of the two cages terminate in spaced relation to each other and are connected by inwardly extending side walls 16, with the latter connected at their inner ends by a transverse wall 17, all of the walls being constructed of any suitable bullet-proof material in order that the occupants of the cages may be properly protected. A partition 18 is arranged centrally of the transverse wall 17 and extends outwardly therefrom so as to co-operate with the side wall 16 and the transverse wall 17 to provide a pair of booths, the outer ends of which are open to permit depositors to enter the booths, as will be understood. The two cages are provided with a common back wall 19 and doorways 20 by which access is had to the cages, and shelves 21 are shown arranged interiorly of the cages to facilitate the handling of moneys, as will be understood.

The transverse wall 17 is constructed as shown in Figure 1 to provide window openings 22, one for each of the booths, each opening being normally spanned by a grated window 23 vertically movable in guides 34 (Figure 3) and limited in its vertical movement by stop pins 35 so that the window can be elevated only a sufficient distance to permit the insertion through the opening of relatively large bundles of money. The window 23 is capable of being elevated manually through the medium of a cable 36 trained over pulleys 37 and operatively connected to the top of the gate as clearly shown in Figure 3. The arrangement of the pulleys as shown in Figure 2 is such that the free end of the cable 36 is disposed at the inner side of the side wall 16 beyond the reach of anyone standing in the booth.

Beneath each window is a table 38, and this table in the present instance is in the form of a disk mounted to rotate about a centrally disposed axis 39, the walls 16 and 17 being slotted to allow rotation of the table in either direction, and the table constituting a platform upon which moneys are adapted to be placed for the transfer of such moneys from the tellers to the depositors or vice versa. The table 38 is limited in its rotational movement in either direction by means of stop pins 40 arranged to engage the opposite sides of the walls 16 and to freely pass through the slots in the wall 17 as shown in Figure 2 and thereby prevent complete rotation of the table. The table is of such diameter as to co-operate with a partition 41 extending inwardly from the rear wall 19 of the cage to prevent the teller from gaining direct access to the window 23, thus directly exposing himself to unscrupulous depositors.

A mirror 42 is arranged on the rear wall 19 and in respect to the window opening 22 so that a teller occupying a position within the cage remote from the window opening is able to observe the reflected image of a depositor in the booth, and vice versa the depositor in the booth is capable of observing the image of the teller located in the cage. In this manner the depositor and teller are visible to each other, but only through the medium of reflection so that a depositor is not directly accessible to the teller, and in this manner the teller is protected at all times from any unscrupulous action of a depositor. Conversational communication between the two is facilitated through the medium of a speaking tube 43 extending through the side wall 16 as clearly shown in Figure 2, and preferably formed of bullet-proof material, with an offset portion as shown so as to eliminate the possibility of one shooting through the speaking tube.

In practice, a depositor is free to enter either booth and a deposit made by placing the money on the table 38, the teller observing the movements of the depositor through the mirror 42, and by rotating the table the money deposited may be conveyed inwardly of the cage to the teller. Any money to be delivered to the depositor is placed upon the table at a point within the cage by the teller and by rotating the table the money may be delivered to the depositor at a point exteriorly of the cage. In this manner the transfer of money between the depositor and the teller may be carried on with facility and dispatch and at the same time the teller is never exposed directly to the depositor.

As shown in Figure 1 each booth contains a light 44 positioned to fully illuminate the depositor and to thus materially aid in the reflection of his image in the mirror so that the teller will have no difficulty in determining the personage of the depositor.

Although I have herein shown and described only one form of teller's cage embodying my invention, it is to be understood that various changes and modifications may be made therein without departing from the spirit of the invention and the spirit and scope of the appended claims.

I claim:

1. In combination, a teller's cage having a laterally disposed window not accessible to a teller, and a table beneath the window arranged with portions disposed in the cage and at the outer side of the window, and the table being rotatable in two directions relatively to the window to permit reversing the positions of the portions with respect to the sides of the window.

2. In combination, a teller's cage having a laterally disposed window not accessible to a teller, and a table beneath the window arranged with portions disposed in the cage and and at the outer side of the window, and the table being rotatable in two directions relatively to the window to permit reversing the positions of the portions with respect to the sides of the window, and a mirror disposed to render the teller in the cage and a depositor at the window visible to each other.

3. A teller's cage comprising a compartment including a pair of vertical walls spaced apart and connected at one end by a transverse wall to provide a relatively deep booth into which a depositor is adapted to enter from a point exteriorly of the compartment, said transverse wall having a window and a slot extending into one of the pair of walls in which a table is adapted to be rotatably mounted with a portion thereof in the booth and another portion in the compartment so that articles placed on the table can, by rotating the latter be conveyed from or to either the booth or compartment, said compartment having a rear wall on which a mirror is adapted to be so positioned that a teller within the compartment at a point remote from said window can view the image of a depositor in the booth through the window and the depositor can likewise view the image of the teller.

EARL E. CRONENWETH.